Feb. 13, 1973   E. O. B. GELHAAR   3,716,118
APPARATUS FOR REGULATING THE OPERATION OF A BRAKE DEVICE
Filed Nov. 19, 1970   4 Sheets-Sheet 2
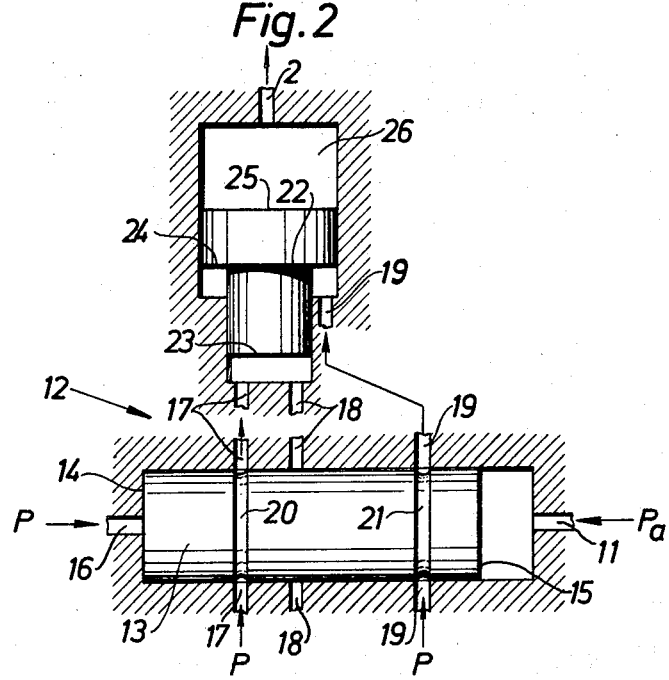
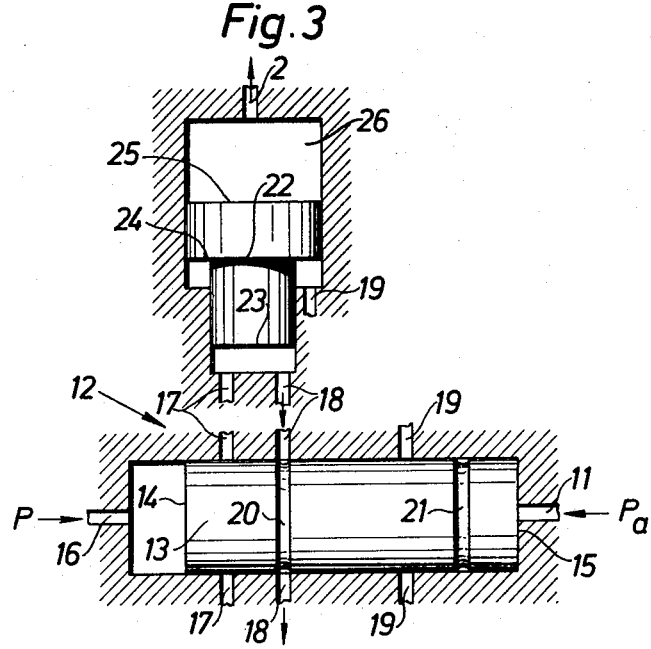

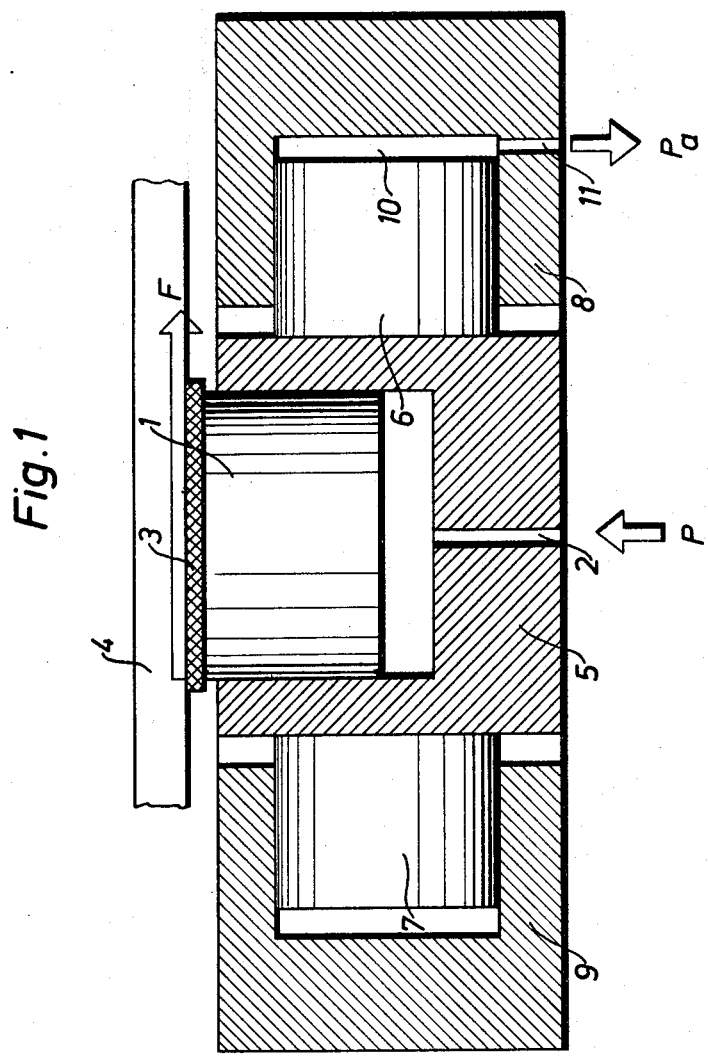

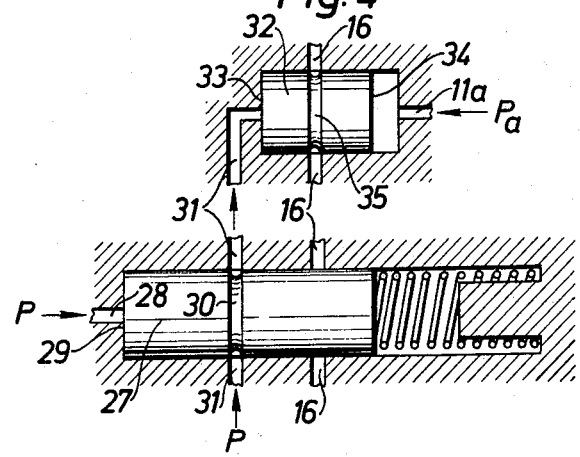
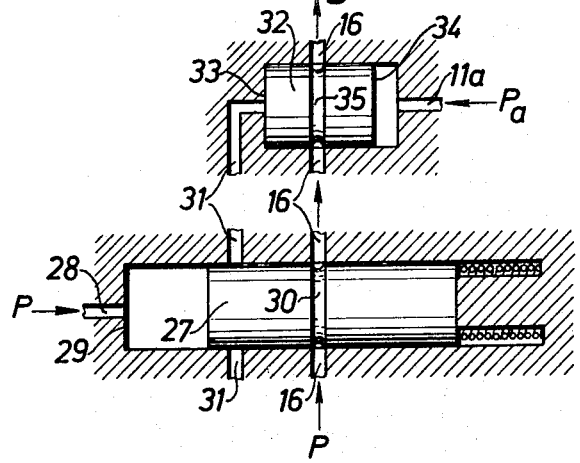
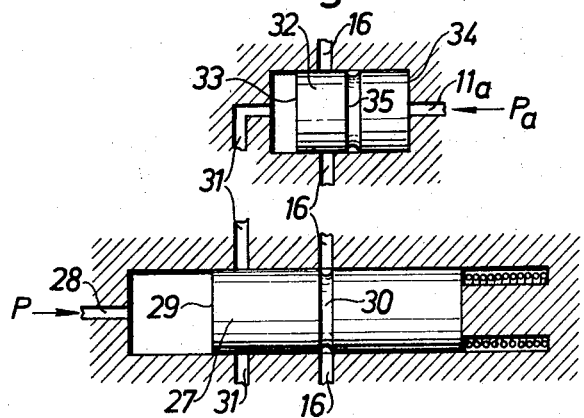

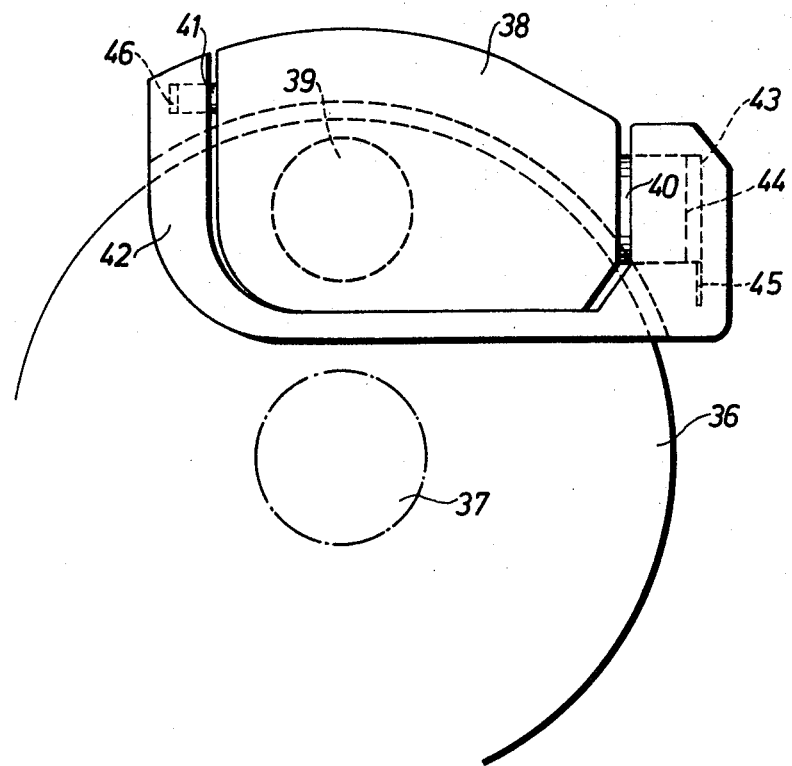

United States Patent Office 3,716,118
Patented Feb. 13, 1973

3,716,118
APPARATUS FOR REGULATING THE OPERATION OF A BRAKE DEVICE
Erik Olov Bo Gelhaar, Kungstorget 7, Lysekil, Sweden
Filed Nov. 19, 1970, Ser. No. 91,133
Claims priority, application Sweden, Nov. 19, 1969, 15,916/69
Int. Cl. B60t 8/02
U.S. Cl. 188—181 T
6 Claims

ABSTRACT OF THE DISCLOSURE

A hydraulic brake actuating and control system for wheeled vehicles is disclosed. The control system senses the frictional force generated by the braking system and regulates the hydraulic pressure whenever a skid condition is sensed. When skidding occurs, a predetermined portion of the hydraulic pressure is dumped to allow the wheels to rotate. The remaining pressure generates a substantial braking force of lower magnitude. The device is automatic and reasserts the original braking force after the skid is terminated.

---

In braking wheeled vehicles the rest friction existing between wheel and road is usually sufficient to keep the wheel rotating during braking. This is of great importance, since the rotation of one hand allows a substantially larger braking force of the braking device than if skidding friction occurs between a locked wheel and the road and on the other hand maintains the steering ability of the vehicle, which, however, is completely lost at skidding friction.

At excessive pedal pressure, particularly when combined with high servo action of the braking device and reduced friction between road and wheel, locking of the wheels may, however, occur with conventional brakes. Various arrangements for preventing such locking have been developed but have not come into wide use in engine driven road vehicles for economical or technical reasons. The main object of the present invention is in a simple manner to provide such control of the braking operation that locking of the wheels is prevented.

The method of the present invention is particularly suited for use in disc brakes comprising on one hand one or more brake discs connected to the supporting wheels of the vehicles, the wheel shaft of any other part which is adapted to be rotated by the vehicle wheels, and on the other hand friction elements, which are mounted at the vehicle and pressed against the disc.

Under normal braking conditions without locking tendency the frictional force transferred from the brake disc to the friction elements during braking is proportional to the pressure in the brake fluid conduit, the area of the piston by which the friction element is pressed against the brake disc and the friction coefficient between the brake lining of the friction element and the brake disc. The frictional force transferred to the friction element, which, if the friction between road and wheel is sufficient to prevent sliding and if the friction coefficient is substantially constant, should exist at a predetermined pressure in the brake fluid conduit, is hereafter defined as the *expected* friction force. The friction force which during braking is actually transferred from the brake disc to the friction element is hereafter defined as the *existing* frictional force. As long as the braking operation continues without sliding the expected frictional force is equal to the existing frictional force.

The method of the present invention resides in that the expected frictional force is continuously compared with the existing frictional force and that the result of the comparison is utilized for controlling the braking operation.

As a measure of the expected frictional force the pressure in the conduit between the master cylinder and the brake piston, which presses the friction element against the brake disc, or any other quantity, which in a definite manner is related to this pressure is preferably used according to the present invention. Such a quantity can be, e.g., the deviation of means, for measuring the pressure in the conduit. The pressure may also act on a surface of a piston, a membrane or the like and the pressure force thus obtained can represent the expected frictional force. The pressure in the brake conduit from the master cylinder to the brake piston will hereafter be designated P.

As a measure of the existing frictional force quantities are selected which can easily be compared with the quantities in which the expected frictional force is measured. As an example, one can let the existing frictional force generate a fluid pressure which is proportional to the frictional force. Such a fluid pressure is well suited to be compared with said pressure in the brake conduit, since it can easily be transformed to a quantity corresponding to any of the quantities mentioned above as a measure of the pressure in the brake conduit. A fluid pressure developed in such manner by the existing frictional force will hereinafter be designated $P_a$.

The present invention will hereinafter be more fully described with reference to the accompanying drawings on which FIG. 1 schematically shows the principles of a device, which can be used for carrying out the method of the invention, said device comprising a movable friction element and fluid pressure generating members responsive thereto, FIGS. 2 and 3 show an embodiment of a device for controlling the braking operation according to the present invention, FIGS. 4, 5 and 6 show another embodiment of a device for controlling the braking operation and FIG. 7 shows an example of the mounting at a brake caliper or the like of a device comprising a movable brake friction element and members responsive thereto for generating a fluid pressure which can be used for controlling the braking operation.

By means of a device according to FIG. 1 it is possible to transform the existing frictional force into a quantity which is suitable for comparison with the expected frictional force. In the device a fluid pressure is generated, which is proportional to the existing frictional force, said fluid pressure being utilized in the manner as suggested according to the present invention.

The device comprises, i.a., a brake piston 1, a brake fluid conduit 2 and a friction element 3, which is connected to the brake piston and is pressed against the brake disc during braking. The brake piston 1 is mounted in a housing 5 and is provided with two pistons 6 and 7. The pistons are arranged so that their centre line is parallel to the main direction of the friction force F which during braking is transferred from the brake disc 4 to the friction element 3. The pistons are movable in the cylinders 8 and 9, which form part of or are secured to the holder of the brake device, e.g., a yoke member of the type illustrated in FIG. 7. In the cylinder 8 a fluid 10 is enclosed, which via a passage 11 communicates with a control device, which will be described below.

At braking a brake liquid having the pressure P is supplied through the brake conduit 2 and thereby acts on the brake piston 1. The brake piston presses the friction element 3 against the brake disc 4 so that a frictional force F is transferred therefrom. The force F tends to move the pistons 6 and 7 in the direction of the force, the piston 6 applying a pressure on the fluid 10 enclosed in the cylinder 8. The pressure $P_a$ developed in the fluid in this manner is proportional to the frictional force F, which is identical with the existing frictonal force as mentioned above. The pressure $P_a$ is well suited to be utilized for comparison with the expected frictional force and the pressure P proportional thereto in the conduit between the master cylinder and the brake piston.

For the operation of the device described it is easily understood that it is of importance that the friction between the pistons 6 and 7 and the cylinders, 8 and 9, respectively, is as low as possible. At high friction identity between the existing frictional force F and the pressure force acting on the enclosed fluid will no longer exist. The pressure $P_a$ developed in the fluid will then no longer be proportional to the existing frictional force. In order to reduce the friction the housing 5 can be secured to a sturdy caliper with a corresponding housing on the opposite side of the brake disc, the connection taking up the force directed perpendicular to the brake disc which force otherwise would cause harmful friction between the pistons and the cylinders during braking. A radical manner to avoid any friction of the kind described is to place a single piston externally of the periphery of the brake disc, where it is symmetrically actuated by frictional forces from both sides of the brake disc. The method is understood from the example illustrated in FIG. 7.

The device according to FIG. 7 is placed over a brake disc 36, which is mounted to the wheel shaft 37 of a vehicle and comprises a caliper 38 straddling the brake disc, in the two legs of which caliper two brake pistons are supported, which act symmetrically on the brake disc and friction elements 39 connected thereto. The caliper is provided at its ends with pistons 40 and 41, each being movable in a cylindrical cavity 43 and 46, respectively, in a yoke-shaped member 42 having legs on either side of the brake disc. The cavity 43 encloses a fluid 44, which communicated via a passage 45 with a control device, which will be described hereinbelow. The yoke-shaped member 42 is connected to the vehicle so that it can follow the brake disc during spring action and steering of the wheel but not its rotation.

When the brake pistons press the friction element against the brake disc, two laterally directed frictional forces are transferred therefrom. The piston 40 is arranged so that its centre line coincides with the resultant of the two frictional forces, and, thus, is not exposed to any harmful friction against the surrounding cavity 43. During braking the piston 40 generates a pressure in the fluid 44 enclosed in the cavity 43. The fluid pressure developed in this manner is transferred via the passage 45 to a control device and is a correct measure of the frictional force existing during braking.

The method of the present invention can be applied in one or more of the housings, wherein the brake pistons of the brake devices are enclosed. In disc brakes comprising only one brake piston, which is located on one leg of the brake caliper, and a friction element, which is not responsive to a brake piston, is located on the other leg on the opposite side of the brake disc, the method can of course be applied also on the latter friction element, which in this case is mounted movable in the direction of the frictional force, together with the caliper, if desired, so that it can act on a pressurized fluid in the manner described above.

Coincidence between the existing and the expected frictional forces persists only as long as the friction of the wheel against the road is sufficient to prevent mentionable sliding. If the braking is so forceful that the road friction is no longer sufficient to prevent sliding but sliding occurs and, finally, at complete locking, skidding occurs, it is easily understood that the existing frictional force on the friction element does no longer equal to but less than expected fricional force. At transition between rest friction and sliding friction between wheel and road the existing frictional force will even be reduced considerably.

The method of the present invention implies that a continuous comparison takes place between the existing and the expected frictional forces and that, at a predetermined deviation between said quantities, such control of the pressure by which the friction elements of the brake device are pressed against the brake disc is effected that locking of the braking device is prevented. Recording or sensing the deviation at a tendency of locking and control of the pressure force on the friction elements of the brake device so as to prevent locking can be performed in various ways. An example thereof, wherein the fluid pressure developed by the existing frictional force is utilized and compared with the pressure in the conduit from the master cylinder, is illustrated in FIGS. 2 and 3.

In order to prevent locking of the brake device and at the same time to maintain the maximum braking power which is allowed by the friction between wheel and road during the actual road conditions, it would be desirable that the pressure force on the friction element after the control operation be adjusted to a value just below the value at which locking occurs. In addition the pressure force after the control operation should be independent of the existing pressure in the conduit from the master cylinder. The example illustrated in FIGS. 2 and 3 is connected with the device according to FIG. 1 and operates according to the method of the present invention. It also fulfills the above-mentioned requirements as to the result of the control operation.

The device comprises a pressure operated control valve 12 with a piston 13 which on the equally large areas 14 and 15 is actuated by the two pressures P and $P_a$, respectively, which are supplied through the passages 16 and 11. The valve 12 is provided with three through passages 17, 18 and 19. The piston 13 is provided with two suitably peripheral grooves 20 and 21 which, when the piston is in its end positions, effect different connections to the through passages. In addition, the device comprises a cylinder member with a divided piston 22, which via the passages 17, 18 and 19 is in communication with the valve 12 and via the passage 2 is also in communication with the brake piston 1 according to FIG. 1. The areas 23 and 24 of the piston 22 actuated by the pressure P via the passages 17 and 19 are together of the same size as the piston area 25 which acts on the fluid enclosed in the cavity 26 of the cylinder member and transfers the pressure to the brake piston. The pressure on the area 23 can be relieved via the outlet passage 18.

In order to be convenient for combination with the device according to FIGS. 2 and 3 the diameters of the pistons 1 and 6 are selected so that the pressure $P_a$ developed under normal conditions exceeds the pressure P in the brake conduit. Each of the two pressures act via the passages 16 and 11 on an end surface 14 and 15, respectively, of the piston 13. As long as the existing frictional force coincides with the expected frictional force, $P_a$ is greater than P and the piston will assume the position illustrated in FIG. 2. Thereby both the area 23 and the area 24 of the piston 22 are responsive to the pressure P in the brake conduit, which is transferred unchanged to the fluid in the cavity 26 and further via the passage 2 to the brake piston.

If, on the contrary, the existing frictional force due to a considerable sliding or skidding of the vehicle wheel is reduced to a value, which is so much less than the expected frictional force that the pressure $P_a$ developed is lower than the pressure P in the brake conduit a control operation will take place. The piston 13 in the pressure operated control valve will then be moved to the position shown in FIG. 3 by the pressure P acting on the area 14. The pressure P via the passages 17 and 19 has then become completely blocked and the pressure on the area 23 of the piston 22 has been released through the outlet 18 and the groove 20. The second area 24 of the piston 22 will then be exposed to a constant pressure, which is equal to the pressure existing in the brake conduit at the moment the control operation was performed. By dimensioning the two areas 23 and 24 in relation to each other in a convenient manner the pressure force with which the friction element thereafter is pressed against the brake disc can be chosen so as to secure that the wheel is kept in rotation. In order thereby to maintain maximum braking power the margin to the pressure force at locking should be kept as small as possible.

Thus, as a result of the control operation the friction element will be actuated by a pressure force which is independant of additional pressure rise in the brake conduit from the master cylinder and which is of such magnitude that it provides optimum braking power at the existing friction coefficient between wheel and road.

It is known in braking of road vehicles on a skiddy surface that the driver repeats and rapidly applies and releaves the pressure force on the brake pedal. By such so-called pump braking it is possible to maintain the steering ability and at the same time to obtain a certain braking power. Such pump braking effect can also be obtained by the method of the present invention by utilizing the deviation between the existing and the expected frictional forces as an impulse to a control operation of the braking operation. Thereby it is possible at a predetermined deviation to releave the pressure on the friction element so that the locking tendency is temporarily terminated to thereafter be applied again and then be repeatedly releaved and applied at short intervals.

A condition for the functioning of the method of the present invention as exemplified in FIG. 1 through 3 is that the friction coefficient between the friction element and the brake disc does not deviate appreciably from its normal value. It is easily understood that if the frictional force transferred to the friction element is lower than the expected frictional force due to the fact that the friction coefficient for some reason is too low, the deviation between the existing and the expected frictional force will give an impulse to a control operation which in this case is unnecessary and even harmful. The reason for such an abnormally low friction coefficient to occur may be, e.g., a water film on the brake disc after washing or the like. In order to avoid that variations of the friction coefficient between brake disc and friction element cause unwanted control operations, the predetermined deviation which is to give an impulse to the control operation may be made relatively high but in such case the operation of the device will suffer to a certain extent. A complement to the method of the present invention which eliminates the disadvantage of control operations caused by an unnormally low friction coefficient between brake disc and friction element is a device that prevents such an unwanted control operation. In principle such a device operates in such a manner that during the initial stage of the braking it disconnects the control mechanism and senses the ratio between the existing and the expected frictional forces. If the coincidence therebetween is disturbed and the existing frictional force is lower than the expected frictional force, this cannot, during the initial stage of braking, depend on any locking tendency of the wheel but must be caused by abnormally low friction coefficient between the brake disc and the friction element. If during the initial stage the device is sensitive of such deviation between existing and expected frictional forces, it puts the automatic control mechanism out of function and the brake mechanism will operate as a conventional brake. In the normal case, when no deviation is present, the mechanism will operate as described above after the termination of the initial stage.

An example of a method of performing such a protection against unnecessary control operations caused by an abnormally low friction coefficient between brake disc and friction element is illustrated in FIG. 4 through 6. The device shown has been designed so that is complies with the devices illustrated in FIG. 1 through 3.

The device comprises a compressed spring loaded piston 27 which is movable in a cylinder with transversal fluid passages 16 and 31 which can be actuated against the spring pressure by the pressure P on the area 29 via the pasage 28. When the piston is located in its end positions, an annular groove 30 in the piston is in communication with one of the passages 31 and 16. The device further comprises a pressure operated piston 32, which is movable in a cylinder with a transversal fluid passage 16 and which can be actuated via the passages 31 and $11_a$ by the pressures P and $P_a$ on the equally large areas 33 and 34. In one end position of the piston 32 an annular groove 35 in the piston is in communication with the passage 16.

During the initial stage of the braking the pressure force which is caused by the pressure P and acts on the areas 29 of the piston 27 is less than the corresponding spring force and the piston will assume the positions as shown in FIG. 4. During the initial stage the passage 31 through which the pressure P is transferred is open, since the groove 30 is then in register with the passage and the pressure P thus acts on the area 33 of the piston 32 at the same time as the area 34 is actuated by the generated pressure P via the passage $11_a$. When the friction coefficient between brake disc and friction element is normal $P_a$ is higher than P as described above and the piston 32 will then assume the position as illustrated in FIG. 4. After termination of the initial stage, i.e., when the pressure P on the piston area 29 has exceeded the spring force, the piston 27 is moved to the position as shown in FIG. 5, whereby the communication 31 to the piston 32 is terminated and the piston is locked. The pressure P is now transferred via the groove 30 and the passage 16 to the control piston 13 according to FIG. 2 and 3, where it acts as a control pressure on the control piston and the piston operates in the manner described above.

If during the initial stage it occurs that the friction coefficient between brake disc and friction element is abnormally low, $P_a$ will be lower than P and the piston 32 will be moved by the latter pressure acting on the area 33, into the position shown in FIG. 6. When later the piston 27 at the termination of the initial stage is moved over the right hand position, the passage will still be blocked, since the groove 35 of the piston 32 is no longer in communication with the passage 16. The piston 32 will remain locked in the position shown in FIG. 6, since the passage 31 is blocked. No control pressure P will thus be able to actuate the control pistion through the passage 16 and the brake device will operate as a conventional brake without a control mechanism.

In all the examples described above such complementary devices as are required or desirable in the practical application but do not form part of the present invention have been excluded for the sake of clearness. Such devices are, i.e., return springs, devices for maintaining locked pressure constant, sealings, dust protectors, etc. Neither do the illustrations show the possibilities of obtaining a delay of the operation of the devices where such delay is desired. A simple manner of obtaining such a delay is the control of fluid flow through a passage by means of a fixed or adjustable restriction in the passage. Also in other respects the examples illustrated may be modified and varied in different manners within the scope of the present invention.

What I claim is:

1. Apparatus for regulating the operation of a brake device for a wheeled vehicle comprising:
   (a) at least one rotatable brake disc and frictional elements engaging said disc,
   (b) a master hydraulic cylinder for generating a first hydraulic pressure for said brake device, said first hydraulic pressure being applied to said frictional elements when said brake device is unregulated,
   (c) means for generating a second hydraulic pressure which is proportional to the existing frictional force transferred from the brake disc to the frictional element, wherein said existing frictional force is defined as the force generated in a plane perpendicular to the axis of the rotational movement of said disc, (d) comparative means for continuously comparing said first and second hydraulic pressures, and (e) regulating means effective upon a predetermined deviation of said first and second hydraulic pressures to generate a third and regulated pressure to be applied to said frictional elements, whereby a predetermined percentage of said first hydraulic pressure is relieved in order to restore the rotation of said disc, while said regulating means continues to provide a substantial braking effect.

2. Apparatus for regulating the operation of a brake device as claimed in claim 1 which further comprises:

(a) valve means for interrupting the flow of fluid to said first comparative means, (b) second comparative means for comparing the first and second hydraulic pressures, said second comparative means operating said valve means to interrupt the flow of fluid to said comparative means when said first hydraulic pressure exceeds the second hydraulic pressure during the initial stage of a braking operation, thereby preventing the regulation of the pressure supplied to said friction element.

3. Apparatus for regulating the operation of a brake device as claimed in claim 1 wherein said regulating means comprises a hydraulic cylinder with a piston having a first pressure generating surface for generating said regulated pressure and applying it to said frictional element.

4. A device for regulating the operation of a brake device as claimed in claim 3 wherein said regulating means further comprises a piston having a second and third pressure receiving surface, the relative dimensions of said second and third receiving surfaces defining the predetermined percentage of said first hydraulic pressure to be relieved when said hydraulic pressure is regulated.

5. Apparatus for regulating the operation of a brake as claimed in claim 4 wherein said comparative device comprises a double-ended hydraulic piston, with the first hydraulic pressure being applied to one of said ends, and the second hydraulic pressure being applied to the other of said ends.

6. A device for regulating the operation of a brake as claimed in claim 5 wherein said comparative piston defines a dump channel for relieving the pressure on the second pressure receiving surface of said regulating piston when said predetermined deviation of said first and second hydraulic pressures occurs.

References Cited

UNITED STATES PATENTS

| | | | |
|---|---|---|---|
| 2,999,567 | 9/1961 | Adams | 188—181 T |
| 3,294,204 | 12/1966 | Zubaty | 303—21 CHX |
| 3,369,635 | 2/1968 | Davis | 188—181 T |
| 3,490,566 | 1/1970 | Von Keszycki | 188—181 T |
| 3,537,759 | 11/1970 | Du Bois | 188—181 TX |

DUANE A. REGER, Primary Examiner

U.S. Cl. X.R.

303—21 CH